United States Patent
Boku et al.

(10) Patent No.: US 6,537,153 B2
(45) Date of Patent: Mar. 25, 2003

(54) GAME SYSTEM, PROGRAM AND IMAGE GENERATING METHOD

(75) Inventors: Katsuya Boku, Yokohama (JP); Washin Boku, Yokosuka (JP)

(73) Assignee: Namco Ltd., Tokyo (JP)

( * ) Notice: Subject to any disclaimer, the term of this patent is extended or adjusted under 35 U.S.C. 154(b) by 84 days.

(21) Appl. No.: 09/907,682

(22) Filed: Jul. 19, 2001

(65) Prior Publication Data

US 2002/0022515 A1 Feb. 21, 2002

(30) Foreign Application Priority Data

Jul. 28, 2000 (JP) ........................................ 2000-229248

(51) Int. Cl.$^7$ ................................................ A63F 13/00
(52) U.S. Cl. ............................................. 463/36; 463/1
(58) Field of Search .................... 473/199; 463/1–5, 463/8, 28–36

(56) References Cited

U.S. PATENT DOCUMENTS 5,319,387 A  *  6/1994  Yoshikawa .................. 345/179
5,414,256 A  *  5/1995  Gurner et al. .............. 364/410
5,690,492 A  *  11/1997  Herald ......................... 434/20
5,833,549 A  *  11/1998  Zur et al. .................... 473/199

* cited by examiner

Primary Examiner—Thomas N. Moulis
(74) Attorney, Agent, or Firm—Oliff & Berridge, PLC

(57) ABSTRACT

A game system, program and image generating method can realistically represent glow or halo occurring around a light source with reduced processing load. A glow object G is displayed nearer to a view point than an object OB when the glow object G overlaps the object OB located nearer to a view point than a light source LS as viewed from a viewpoint. The glow object G is drawn at a position on a perspective transformation plane corresponding to the position of the light source LS. If the object OB is on a line between the light source LS and the viewpoint, the glow object G is made non-display or reduced in its effect intensity. The effect intensity of the glow is varied according to the degree of overlap between the object OB and the light source LS (or glow object G) as viewed from the viewpoint. The effect intensity of the glow may be varied according to the distance between the line between the light source LS with the viewpoint and the object OB or the area of overlap between the object OB and the light source LS (or glow object G). The degree of overlap is judged using the bounding volumes for the object OB and light source LS (or glow object G).

39 Claims, 18 Drawing Sheets

GLOW IS DISPLAYED
NEARER TO VIEW POINT

NO OVERLAP
P_G (EFFECT INTENSITY) = Pmax
$\alpha = \alpha$max
(OPAQUE)

SMALLER OVERLAP
P_G = P0 (< Pmax)
$\alpha = \alpha 0$ (< $\alpha$max)

LARGER OVERLAP
P_G = P1 (< P0)
$\alpha = \alpha 1$ (< $\alpha 0$)

FULLY OVERLAP
P_G = Pmin (< P1)
$\alpha = \alpha$min (< $\alpha 1$)
(TRANSPARENT)

VARY P_G ($\alpha$) ACCORDING TO DISTANCE D

VARY P_G ($\alpha$) ACCORDING TO AREA S

VARY P_G ($\alpha$) ACCORDING TO AREA SB

GAME SYSTEM, PROGRAM AND IMAGE GENERATING METHOD

Japanese Patent Application No. 2000-229248, filed Jul. 28, 2000, is hereby incorporated by reference in its entirety.

TECHNICAL FIELD

The present invention relates to a game system, program and image generating method.

BACKGROUND

There is known an image generating system which can generate an image as viewed from a given viewpoint within a virtual three-dimensional or object space. Such a system is very popular since one can experience a so-called virtual reality through it. Now considering a image generating system for playing a gun game, a player (or operator) can enjoy a three-dimensional shooting game by manipulating a gun-shaped controller (or shooting device) to shot targets such as enemy characters (or model objects) and the like which are displayed on a screen.

In order to improve the virtual reality for a player in such an image generating system, it was an important technical problem to produce more realistic images. It is thus desirable that for example, even a glow or halo occurring about a light source such as flame or candle can more really be represented.

However, when such a glow or halo is to be represented more truly by a physical simulation, the process load on the game system will highly be increased. This cannot meet requirements for the real-time processing in which all the objects must have been drawn during one frame.

As one technique of representing such a glow or halo, it may be considered that any object virtually representing the glow or halo is merely disposed at the position of the light source.

However, such a technique cannot represent the diffraction (wraparound) of the glow or halo. Thus, it cannot highly improve the reality in image.

SUMMARY

One aspect of the present invention provides a game system generating an image, comprising:

means for performing a processing to display at least part of a light source effect object, which is used to virtually represent a glare of a light source, nearer to a viewpoint than a first object, when the first object located nearer to the viewpoint than the light source overlaps the light source effect object as viewed from the viewpoint; and means for generating an image viewable from the viewpoint in an object space.

Another aspect of the present invention also provides a game system generating an image, comprising:

means for making non-display a light source effect object used to virtually represent a glare of a light source or for reducing effect intensity of the light source effect object when a first object is on a line between the light source and a viewpoint; and means for generating an image viewable from the viewpoint in an object space.

Further aspect of the present invention further provides a game system for generating an image, comprising:

means for varying effect intensity of a light source effect object, which is used to virtually represent a glare of the light source, according to a degree of overlap between the light source and a first object located nearer to a view point than the light source or between the light source effect object and the first object as viewed from the viewpoint; and means for generating an image viewable from the viewpoint in an object space.

DETAILED DESCRIPTION

Figure 1:
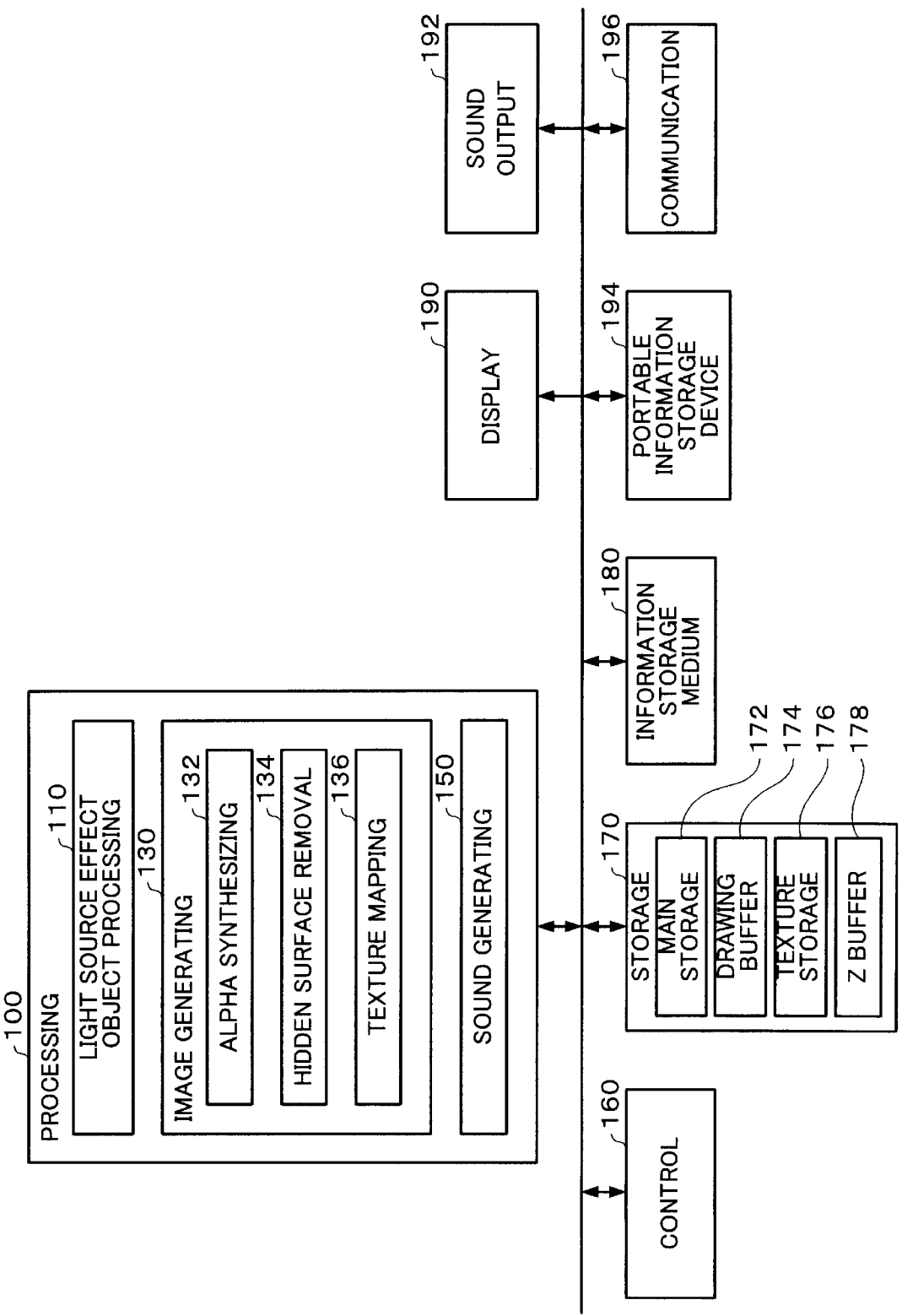
FIG. 1 is a functional block diagram of a game system according to this embodiment.

The embodiment of the present invention is devised to overcome the aforementioned technical problem. This embodiment can provide a game system, program and image generating method which can more really represent a glow or halo occurring about a light source with reduced process load.

This embodiment will now be described.

This embodiment described blow will not restrict the contents of the present invention as claimed in the appending claims. All the parts described in this embodiment are not necessarily essential as means of the present invention for solving the technical problem.

This embodiment provides a game system generating an image, comprising: means for performing a processing to display at least part of a light source effect object, which is used to virtually represent a glare of a light source, nearer to a viewpoint than a first object, when the first object located nearer to the viewpoint than the light source overlaps the light source effect object as viewed from the viewpoint; and means for generating an image viewable from the viewpoint in an object space. This embodiment also provides a computer-usable program embodied on an information storage medium or in a carrier wave (transmission medium), comprising a process routine for executing the aforementioned means.

According to this embodiment, when a light source effect object used to represent the glow or halo and the like of a light source overlaps a first object obstructing (covering) the light source as viewed from a viewpoint, at least part of the light source effect object is displayed nearer to a view point than the first object. The diffraction of the glow or halo and the like can be virtually represented through a simplified technique of using the light source effect object, resulting in generation of a realistic image with reduced process load.

In the game system, program and image generating method according to this embodiment, the light source effect object may be drawn between the first object and the viewpoint, even when the first object is located nearer to the viewpoint than the light source.

Thus, a viewer (or player) can have an illusion as if the light from the light source effect object at the position of the light source rounded forward of the first object. It is desirable that the magnitude of the light source effect object is scaled to be reduced as the distance from the viewpoint to the light source increases.

In the game system, program and image generating method according to this embodiment, the light source effect object may be drawn at a position on a perspective transformation plane corresponding to a position of the light source.

Thus, the light source effect object can be displayed nearer to a view point than the first object through a simplified process of only drawing the light source effect object (e.g., two-dimensional sprite) on the perspective transformation plane. Thus, the viewer can have an illusion as if the light of the light source effect object at the light source position rounded nearer to a view point than the first object. It is desirable that the magnitude of the light source effect object on the perspective transformation plane is scaled to be reduced as the distance from the viewpoint to the light source increases.

In the game system, program and image generating method according to this embodiment, the light source effect object may be made non-display or effect intensity of the light source effect object is reduced when the first object is on a line between the light source and the viewpoint.

This embodiment further provides a game system generating an image, comprising: means for making non-display a light source effect object used to virtually represent a glare of a light source or for reducing effect intensity of the light source effect object when a first object is on a line between the light source and a viewpoint; and means for generating an image viewable from the viewpoint in an object space. This embodiment further provides a computer-usable program embodied on an information storage medium or in a carrier wave, comprising a process routine for executing the aforementioned means.

According to this embodiment, when it is judged that the first object is on a line between the light source and the viewpoint, the light source effect object is made non-display (eliminated) or reduced in its effect. Thus, a situation in which the glow or halo and the like disappears when the light source is obstructed by the first object can really be represented. Since this only requires the checking of the first object relating to whether or not it is on the line between the viewpoint and the light source, the realistic representation of image can be carried out with reduced process load. If the light source effect object is disposed at a point of intersection between the line between the light source with the viewpoint and the perspective transformation plane, the common processing can be used to further reduce the process load.

In the game system, program and image generating method according to this embodiment, the effect intensity of the light source effect object may be varied according to a degree of overlap between the first object and the light source or between the first object and light source effect object as viewed from the viewpoint.

This embodiment further provides a game system for generating an image, comprising: means for varying effect intensity of a light source effect object, which is used to virtually represent a glare of the light source, according to a degree of overlap between the light source and a first object located nearer to a view point than the light source as viewed from the viewpoint or between the light source effect object and the first object; and means for generating an image viewable from the viewpoint in an object space. This embodiment further provides a computer-usable program embodied on an information storage medium or in a carrier wave, comprising a process routine for executing the aforementioned means.

According to this embodiment, the effect intensity of the light source effect object is varied depending on the degree of overlap between the first object and the light source (or the light source effect object). As the degree of overlap between the first object and the light source (or the light source effect object) increases, the effect intensity of the light source effect object can gradually be reduced, providing a more realistic image generated.

In the game system, program and image generating method according to this embodiment, the effect intensity of the light source effect object may be varied according to a distance between a line between the light source with the viewpoint and the first object.

Thus, the degree of overlap between the first object and the light source (or the light source effect object) can be judged through a simplified process of only determining the distance between the line between the light source with the viewpoint and the fist object. If the light source effect object is disposed at a position of intersection between the line between the light source with the viewpoint and the perspective transformation plane, the common process can be used to further reduce the process load.

In the game system, program and image generating method according to this embodiment, the light source effect object may be made non-display when the distance between the line between the light source with the view point and the first object is smaller than a given first distance.

Thus, a situation in which the glow or halo and the like is not displayed when the light source is obstructed (covered) by the first object can be represented really.

In the game system, program and image generating method according to this embodiment, the effect intensity of the light source effect object may be varied according to an area of overlap between the first object and the light source or between the first object and light source effect object as viewed from the viewpoint.

Thus, the degree of overlap between the first object and the light source (or the light source effect object) can be judged through a simplified process of only determining the area of overlap (or ratio of overlap) between the first object and the light source (or the light source effect object). This can also reduce the process load.

In the game system, program and image generating method according to this embodiment, the light source effect object may be made non-display when an area of overlap between the first object and the light source or between the first object and light source effect object as viewed from the viewpoint is larger than a given first area.

Thus, a situation in which the glow or halo and the like disappears when the light source is obstructed by the first object can be represented really.

In the game system, program and image generating method according to this embodiment, the effect intensity of the light source effect object may be varied by controlling alpha ($\alpha$) value in the light source effect object according to the degree of overlap between the first object and the light source effect object as viewed from the viewpoint.

Thus, the effect intensity of the light source effect object can be varied through a load-reduction process of only controlling the alpha value. The effect intensity of the light source effect object may be controlled based on the luminance, quantity of light or magnitude of the light source effect object or a texture to be mapped.

In the game system, program and image generating method according to this embodiment, the degree of overlap between the first object and the light source or between the first object and the light source effect object may be determined using at least one of a first bounding volume for the first object and a second bounding volume for the light source or the light source effect object.

Thus, the degree of overlap between the first object and the light source (or the light source effect object) can be judged using the first and second bounding volume (bounding boxes or simplified objects) including a reduced number of configuration points (or vertexes). Therefore, the load on the process of determining the effect intensity of the light source effect object or the other process can further be reduced.

This embodiment will now be described in more detail with reference to the drawings.

1. Arrangement

FIG. 1 shows a functional block diagram of a game system (or image generating system) according to this embodiment. In this figure, this embodiment may comprise at least a processing section 100 or a processing section 100 with a storage section 170. Each of the other blocks may be arbitrary component.

A control section 160 is used to input operational data from the player and the function thereof maybe realized through any suitable hardware means such as lever, button, microphone, housing or the like.

A storage section 170 provides a working area for the processing section 100, communication section 196 and others. The function thereof may be realized by any suitable hardware means such as RAM or the like.

An information storage medium (which may be a computer-usable storage medium) 180 is designed to store information including programs, data and others. The function thereof may be realized through any suitable hardware means such as optical memory disk (CD or DVD), magneto-optical disk (MO), magnetic disk, hard disk, magnetic tape, memory (ROM) or the like. The processing section 100 performs various processings in the present invention (or this embodiment) based on the information that has been stored in this information storage medium 180. In other words, the information storage medium 150 has stored various pieces of information (or programs or data) for executing the means of the present invention (or this embodiment) which are particularly represented by the blocks included in the processing section 100.

Part or the whole of the information stored in the information storage medium 180 will be transferred to the storage section 170 when the system is initially powered on. The information stored in the information storage medium 150 may contain a program for performing the processings in the present invention, image information, sound information, shape information of objects to be displayed, command information for the processings in the present invention, information for performing the processings according to the commands and so on.

A display section 190 is designed to output images generated according to this embodiment. The function thereof may be realized by any suitable hardware means such as CRT, LCD, HMD (head mount display) or the like.

A sound output section 192 is designed to output sounds generated according to this embodiment and the function thereof may be realized by any suitable hardware means such as speaker or the like.

A portable information storage device 194 is to store player's personal data, saved game data and so on. Such a portable information storage device 194 may be in the form of a memory card or portable game machine.

A communication section 196 is designed to perform various controls for communication between the game system and any external device (e.g., host device or other image generating system). The function thereof may be realized through any suitable hardware means such as communication ASIS or the like or according to any program.

The program or data used to realize the means in the present invention (or this embodiment) may be delivered from an information storage medium included in a host device (or server) to the information storage medium 180 through a network and the communication section 196. The use of such an information storage medium in the hose device (or server) falls within the scope of the invention.

The processing section (or processor) 100 is designed to perform various processings including game processing, image generation, sound generation and the like, based on the operational data and program from the control section 160. In such a case, the processing section 100 will perform the various processings using a working region which is provided by a main storage section 172 in the storage section 170.

The processing section 100 may be designed to perform various game processings such as coin (or charge) reception, setting of various modes, game proceeding, setting of selected scene, determination of the position and rotation angle (about X-, Y- or Z-axis) of an object (consisting of one or more primitive faces), causing the object to act (motion processing), determination of the viewpoint position (or virtual camera position) and visual line angle (rotational angle in the virtual camera), arrangement of an object such as a mapped object or the like within the object space, hit checking, computation of the game results (or scores), processing for causing a plurality of players to play in a common game space, game-over and other processes.

The function of this processing section 100 may more preferably be realized through a combination of any suitable hardware means including a processor such as CPU or DSP or ASIC such as gate array with a program (game program, firmware or the like). However, the entire function of the processing section 100 may be realized in a hardware manner or according a program.

The processing section 100 includes a light source effect object processing section 110, an image generating section 130 and a sound generating section 150.

The light source effect object processing section 110 is designed to perform various processings for displaying a light source effect object used to virtually represent the glare of the light source (or object for virtually representing the glow or halo and the like).

More particularly, the light source effect object processing section 110 is so designed that when a light source effect object overlaps a first object (obstructing object such as character or the like) located nearer to the viewpoint than a light source (which may be a virtual light source not used in the shading) as viewed from the viewpoint, part or whole of the light source effect object will be displayed nearer to the view point than the first object.

Alternatively, the processing section 100 may be so designed that when the first object is on a line between the light source and the viewpoint (or when the line between the light source and the viewpoint intersects the first object), the light source effect object will be made non-display (eliminated) or the effect intensity (such as the luminance, quantity of light, magnitude or alpha value of the light source effect object) of the light source effect object will be reduced.

Alternatively, the effect intensity of the light source effect object may be varied according to the degree of overlap (or area of overlap) between the first object and the light source (or the light source effect object) as viewed from the viewpoint or the distance between the first object and the light source (or the light source effect object).

The image generating section 130 is designed to generate an image (view image) viewable from a given viewpoint (virtual camera) within the object space, based on the result of game processing and so on. The generated image is then drawn in a drawing (rendering) buffer 174 and subsequently outputted through the display section 190.

More particularly, a geometry processing such as coordinate transformation, clipping, perspective transformation, light-source calculation or the like is first performed. The result thereof is then used to prepare drawing data such as positional coordinates to be given to the configuration points (vertexes) of a primitive face, texture coordinates, color (luminance) data, normal vector or alpha value. Based on this drawing data (primitive face data), the image generating section 130 draws the image of an object (having one or more primitive faces) subjected to the geometry processing in the drawing buffer 174 (which may be a buffer for storing image information in pixel unit such as a frame buffer or work buffer).

The image generating section 130 comprises an alpha ($\alpha$) synthesizing section 132, a hidden surface removal section 134 and a texture mapping section 136.

The alpha synthesizing section 132 is operative to perform an alpha ($\alpha$) synthesization using alpha value, such as alpha ($\alpha$) blending, alpha ($\alpha$) addition or alpha ($\alpha$) subtraction. The alpha value (A value) is information stored in association with each pixel, for example, plus alpha ($\alpha$) information other than the color information. The alpha value may be used as translucency information (such as degree of translucency, transparency or opacity), mask information, bump information or the like.

The hidden surface removal section 134 is operative to remove a hidden surface by use of a Z buffer 178 stored Z value (depth value) according to Z buffer algorithm. The erasure of hidden surface may be performed according to a depth sorting process (or Z sorting process) in which primitive faces (such as polygons, free curved faces or the like) are sorted according to the distance from the viewpoint such that they will be drawn in a sequence starting from the farthest one.

The texture mapping section 136 is operative to map a texture stored in a texture storage section 176 onto the object.

The sound generating section 150 is operative to perform various sound processings for generating BGM, sound effect or voice based on the results of game processing. The generated sounds are then outputted toward the sound output section 192.

The game system of the present invention may be dedicated for a single-player mode in which only a single player can play the game or may have a multi-player mode in which a plurality of players can play the game.

When a plurality of players play the game, only a single terminal may be used to generate game images and sounds to be provided to all the players. Alternatively, a plurality of terminals interconnected through a network (transmission lien or communication line) may be used in the present invention.

2. Features of this Embodiment
2.1 Glow Representation

Figure 2A:
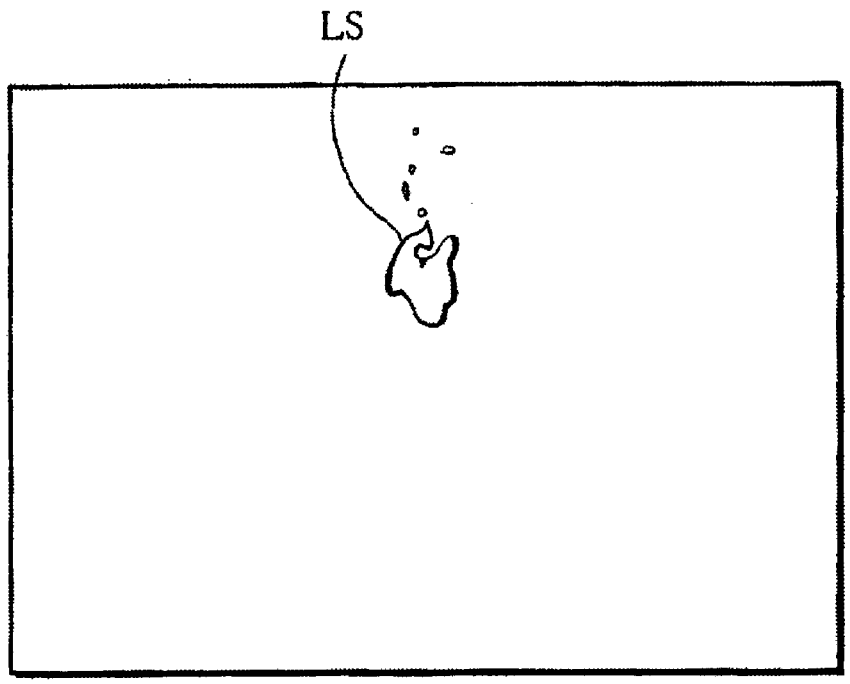
FIGS. 2A and 2B exemplify images of a light source LS and glow object G.
Figure 2B:
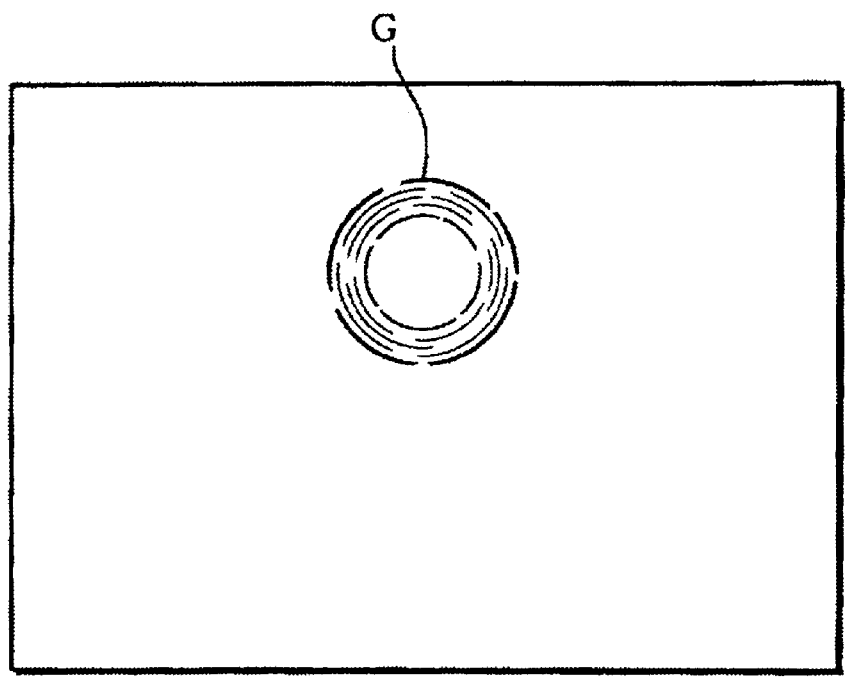
Figure 3:
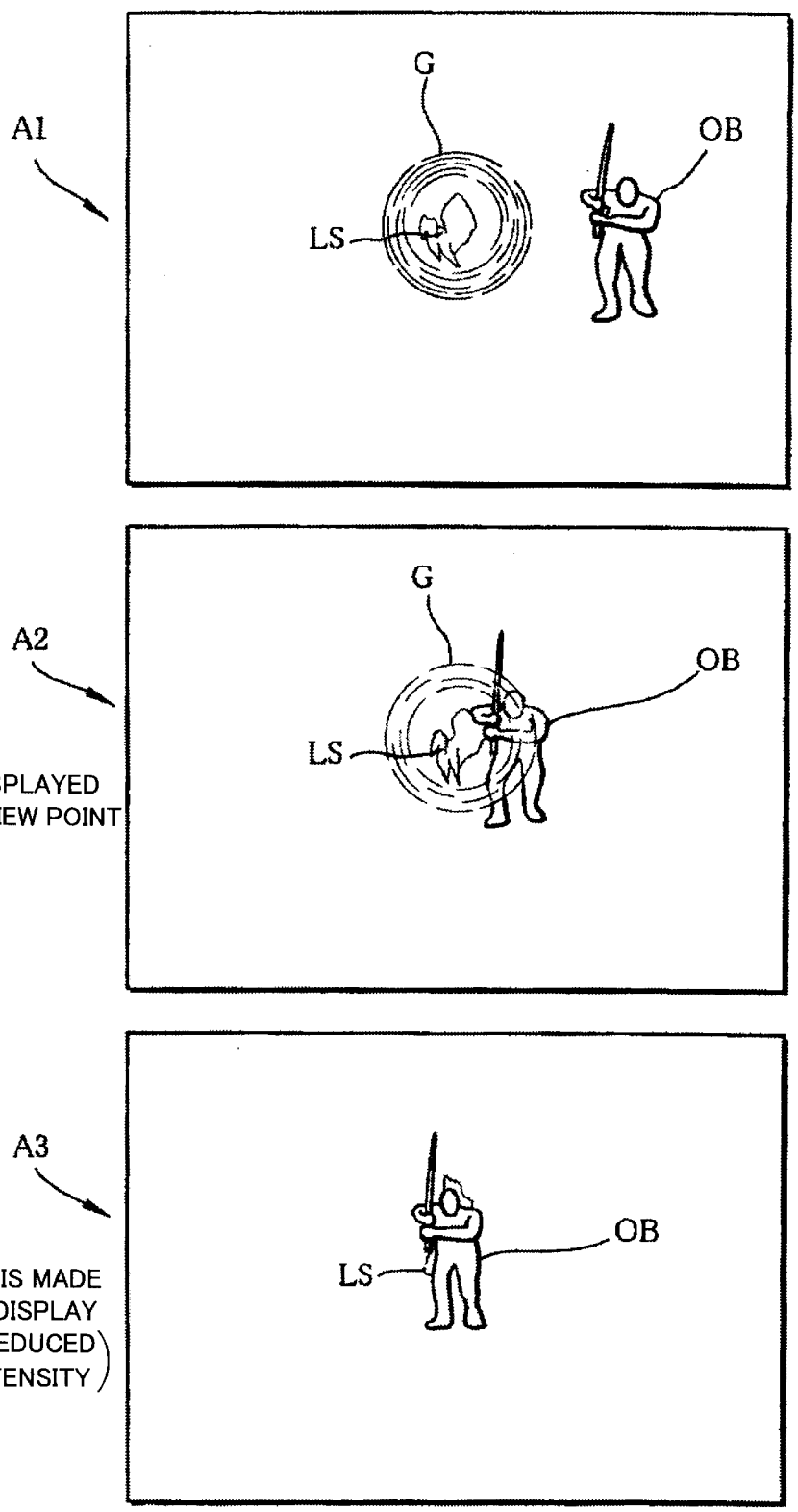
FIG. 3 exemplifies game images generated according to this embodiment.
Figure 4:
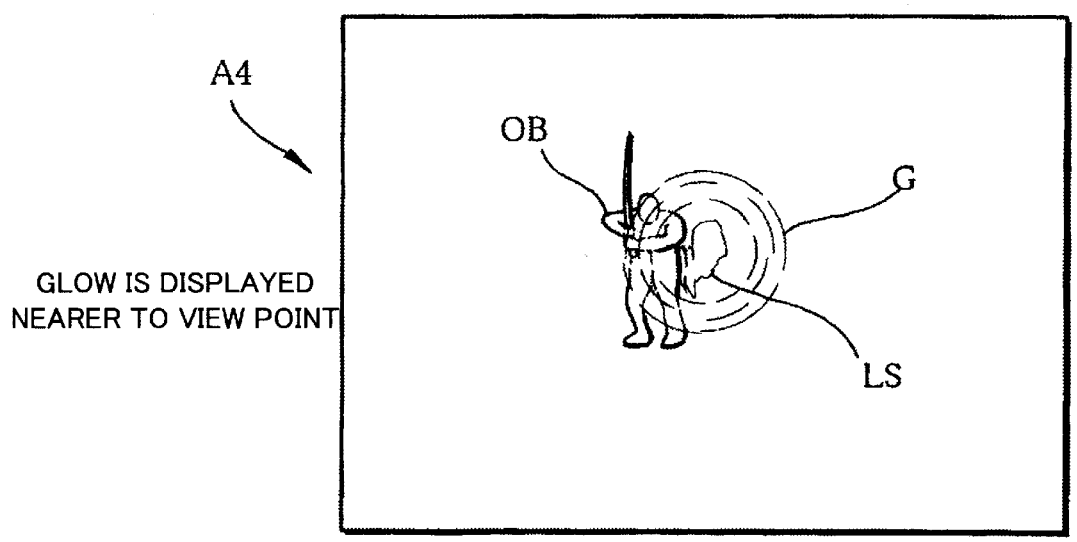
FIG. 4 exemplifies other game images generated according to this embodiment.
Figure 4:
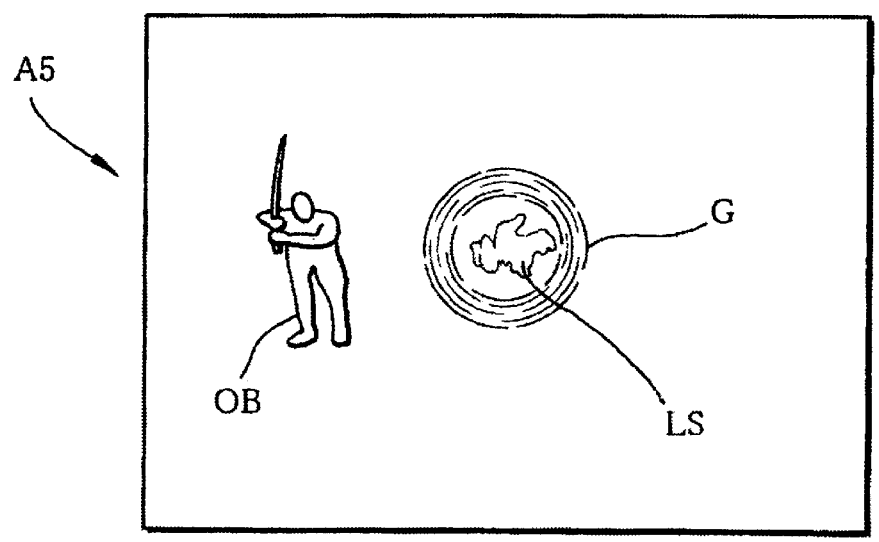

FIGS. 2A and B exemplify images of light source LS (flame) and glow object G (in a broad sense, light source effect object). FIGS. 3 and 4 exemplify game images generated according to this embodiment.

Although the following discussion will be made in connection with the representation of glow (or bright light around the light source) to which the present invention is applied, the present invention may be similarly applied to the representation of halo (light ring), lens flare or star filter effect providing radial locus of light. The light source including flame, bonfire, candle flame, torch, sun, moon or searchlight is not necessarily one actually used in the shading process, but may a virtual (pseudo) light source (or picture of light source) on which a high-intensity texture is mapped.

Figure 5:
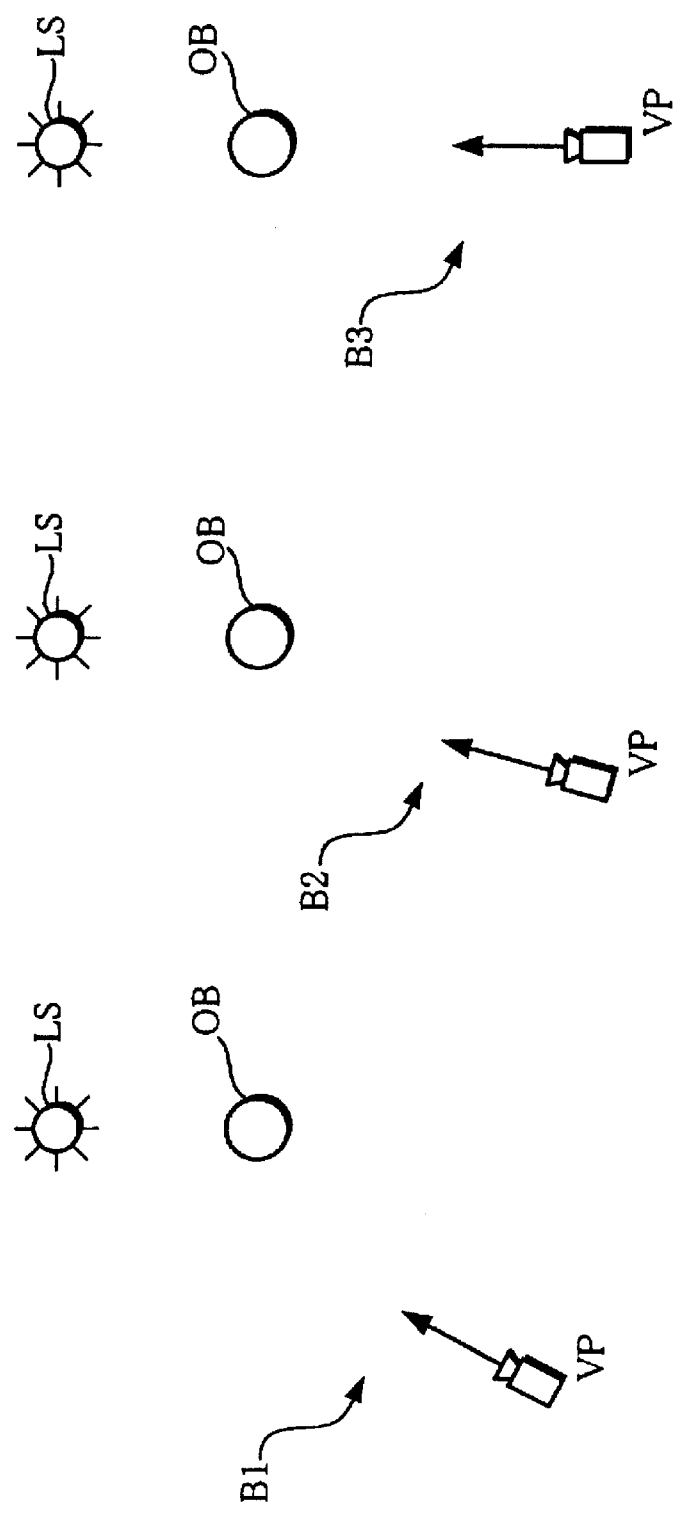
FIG. 5 illustrates the positional relationships between a viewpoint VP, an object OB and the light source LS.
Figure 6:
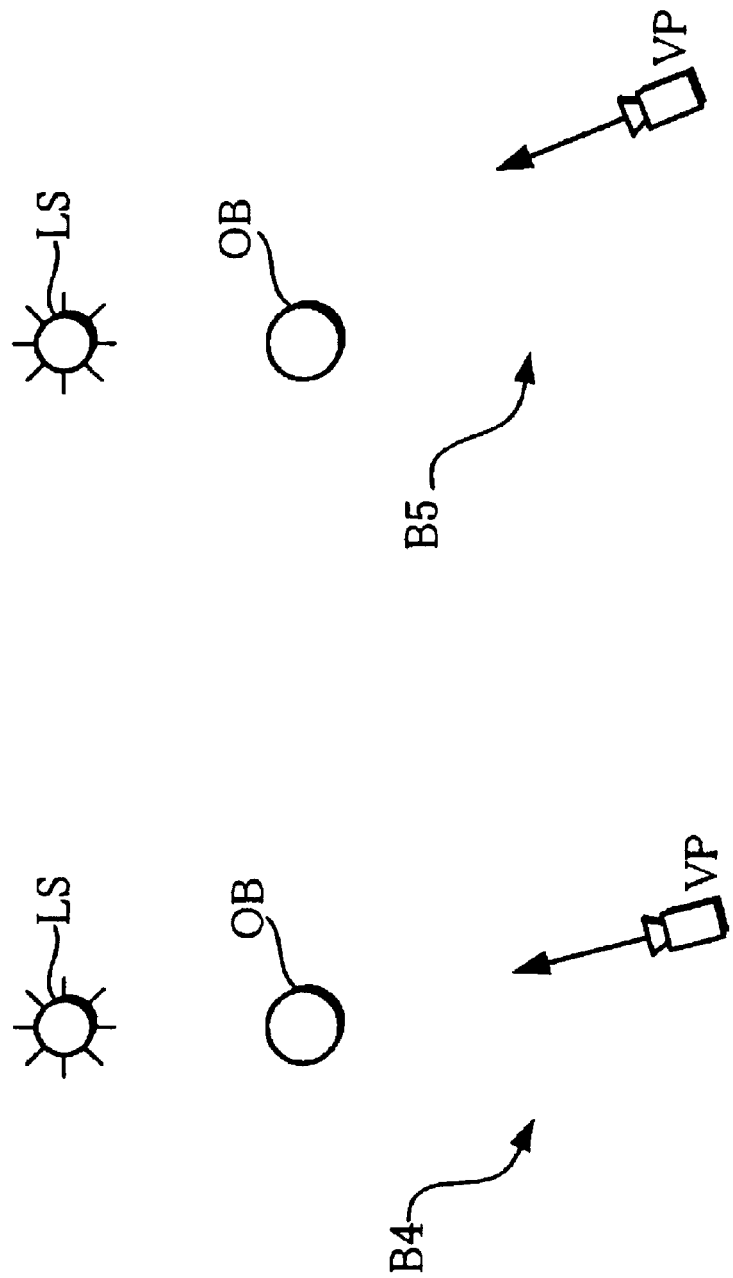
FIG. 6 illustrates the positional relationships between a viewpoint VP, an object OB and the light source LS.

A1, A2 and A3 of FIG. 3 and A4 and A5 of FIG. 4 designate game images generated when the positional relationships between the viewpoint VP (virtual camera), object OB (first object) and light source LS are as shown in FIGS. 5 and 6 at B1, B2 and B3; B4 and B5.

At A1 of FIG. 3 (or B1 of FIG. 5), a glow object G (which may be a two-dimensional sprite or three-dimension object) is displayed at the position of the light source LS. Thus, a more realistic image can be generated as if a glow occurs around the light source LS.

At A2 of FIG. 3 (or B2 of FIG. 5), the object OB (first object) representing a character overlaps the glow object G (light source effect object) as viewed from the viewpoint VP. In such a case, this embodiment displays the glow object G nearer to a viewpoint than the object OB. Thus, the glare of the light or the wraparound of the glow-light (which may occur due to the diffraction of light) can successfully be represented in a pseudo manner.

A first technique of representing the glow may be one that the glow object G is merely disposed at the position of the light source LS.

According to the first technique, a realistic image can be generated successfully to some degree when the object OB does not overlap the glow object G as shown by A1 in FIG. 3. However, when the object OB overlaps the glow object G as shown by A2 in FIG. 3, the glow object G will be displayed at a farther sight to the viewpoint than the object OB so that the glow will be hidden by the object OB. Therefore, the diffraction of the glow light will not be represented. The reality of image cannot be very improved.

On the other hand, a second technique of representing the glow may be considered in which the diffraction of light or the like is faithfully simulated according to a physical model.

The second technique can represent even the wraparound of the glow light as shown by A2 in FIG. 3 really to some degree. However, this will highly increase the processing load because of the physical simulation relating to the diffraction of light or the like. Therefore, the second technique cannot meet the severe requirements of real-time processing for such a type of game system.

On the contrary, this embodiment represents the glow using the glow object G (i.e., two-dimensional sprite or three-dimensional object). As a result, this embodiment has a very reduced processing load in comparison with the representation of glow by the physical simulation. On the other hand, this embodiment displays the glow object G nearer to a view point than the object OB when the object OB overlaps the glow object G as viewed from the viewpoint, as shown by A2 in FIG. 3. Therefore, the diffraction of the glow light can really be represented without use of the physical simulation, resulting in generation of a realistic image with reduced processing load.

At A3 of FIG. 3 (or B3 of FIG. 5), the object OB fully overlaps the light source LS. More particularly, the object OB is on a line between the viewpoint VP and the light source LS. In such a case, this embodiment makes the glow object G non-display or reduces the effect intensity of the glow object G. Thus, a situation in which the glow is not displayed by the object OB obstructing the light source LS can be represented in a real manner. In addition, this embodiment can perform such a representation merely by checking whether or not the object OB is on the line between the viewpoint VP and the light source LS (or whether or not the line between the viewpoint VP and the light source LS intersects the object OB). Therefore, a realistic representation can be made with reduced processing load.

At A4 of FIG. 4 (or B4 of FIG. 6), the object OB overlaps the glow object G as viewed from the viewpoint VP. In such a case, the glow object G is displayed nearer to a viewpoint than the object OB, as in A2 of FIG. 3. The diffraction of the glow light can be represented in the pseudo manner. At A5 of FIG. 4 (or B5 of FIG. 6) there is no overlap between the object OB and the glow object G. Thus, the glow object G is displayed at the position of the light source LS.

The display of the glow object G as described in connection with FIGS. 3 and 4 may be realized, for example, by drawing the glow object G between the object OB and the viewpoint VP even when the object OB is located nearer to a view point than the light source LS.

Figure 7:
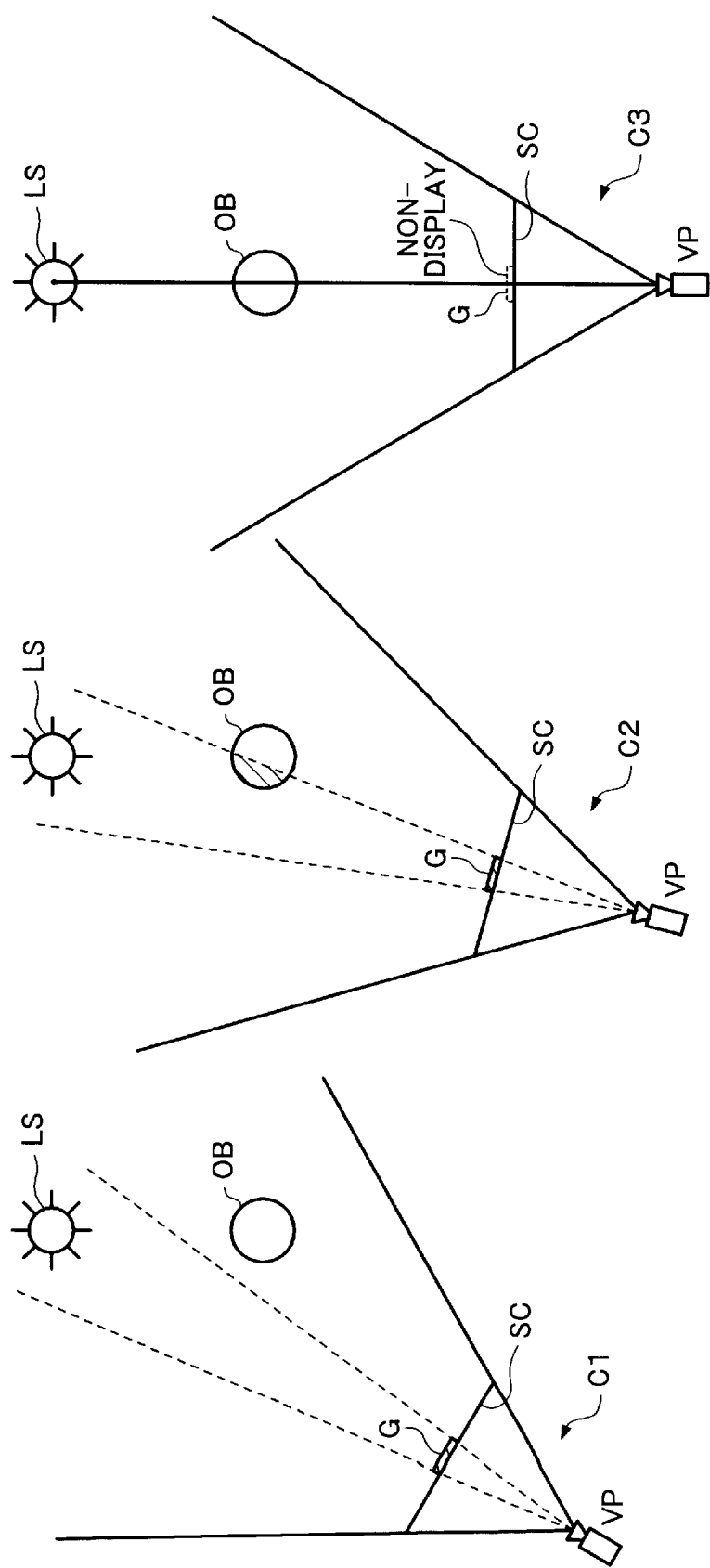
FIG. 7 illustrates a technique of drawing the glow object G on a perspective transformation plane SC.

More particularly, as shown by C1 and C2 in FIG. 7, the glow object G is drawn at a position on a perspective transformation plane SC (screen) corresponding to the position of the light source LS, which position may be a point of intersection between the line between the viewpoint VP with the light source LS and SC. In other words, the glow object G formed by two-dimensional sprite or the like is drawn on the nearest surface as viewed from the viewpoint VP.

In such a manner, the glow object G will be displayed normally around the light source LS when the glow object G does not overlap the object OB as viewed from the viewpoint VP as shown in FIG. 7 at C1. On the contrary, when the glow object G overlaps the object OB as viewed from the viewpoint VP as shown in FIG. 7 at C2, the glow object G will be displayed nearer to a view point than the object OB. Thus, such game images as shown in FIG. 3 at A1 and A2 and in FIG. 4 at A4 and A5 can be generated through a simplified manner.

On the other hand, as shown in FIG. 7 at C3, the glow object G displayed on the perspective transformation plane SC is made non-display (eliminated) when it is judged, from hit-checking between the line between the viewpoint VP and the light source LS and the object OB, that the object OB is on this line. Thus, such a game image as shown in FIG. 3 at A3 can be generated in a simplified manner.

It also desirable that the magnitude of the glow object G drawn on the perspective transformation plane SC is varied, for example, according to the distance between the viewpoint VP and the light source LS (line distance or depth distance) In other words, when the distance between the viewpoint VP and the light source LS is larger, the scaling rate for the glow object G is reduced, resulting in a reduced glow object G drawn on the perspective transformation plane SC. On the other hand, when the distance between the viewpoint VP and the light source LS is smaller, the scaling rate for the glow object G is increased to draw an enlarged glow object G on the perspective transformation plane SC. Thus, the displayed glow object G can have an appropriate perspective.

2.2 Control of Effect Intensity in Glow

To provide a more realistic representation of glow, it is desirable that the effect intensity (such as luminance, quantity of light, magnitude or alpha value) of the glow object G is varied according to the degree of overlap between the object OB and the light source LS (or glow object G) as viewed from the viewpoint.

Figure 8A:
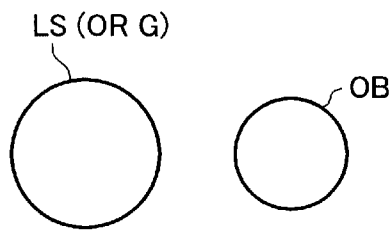
FIGS. 8A, 8B, 8C and 8D illustrate a technique of varying the effect intensity P_G (alpha value) depending on a degree of overlap between the object OB and the light source LS.

For example, when there is no overlap between the object OB and the light source LS (or glow object G) as shown in FIG. 8A, the effect intensity P_G of the glow may be set at the maximum value, P max. More particularly, the alpha value of the glow object G (or alpha value of texture or alpha value of polygon vertex) may be set at $\alpha$ max (opaque), for example.

Figure 8B:
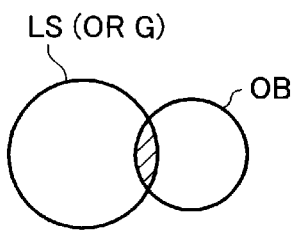

On the other hand, when the degree of overlap between the object OB and the light source LS (or glow object G) is smaller as shown in FIG. 8B, the effect intensity P_G of the glow may be set at P0 (<P max). More particularly, the glow object G may be made translucent by setting the alpha value of the glow object G at $\alpha 0$ (<$\alpha$ max), for example. Thus, the effect intensity of the glow can be reduced.

Figure 8C:
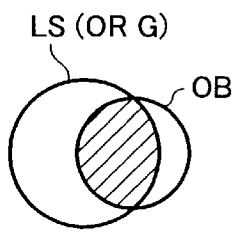

When the degree of overlap between the object OB and the light source LS (or glow object G) is larger as shown in FIG. 8C, the effect intensity P_G may be set at P1 (<P0). More particularly, for example, the glow object G may be made more transparent than that of FIG. 8B by setting the alpha value of the glow object G at $\alpha 1$ (<$\alpha 0$). Thus, the effect intensity of the glow can further be reduced.

Figure 8D:
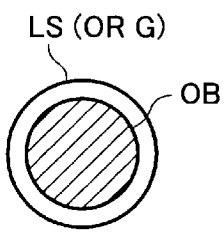

If the object OB fully overlaps the light source LS (or glow object G) as shown in FIG. 8D, the effect intensity P_G may be set at P min (<P1). More particularly, for example, the glow object G may be made fully transparent by setting the alpha value of the glow object G at $\alpha$ min (<$\alpha 1$) Thus, the glow object G can be made non-display.

Figure 9A:
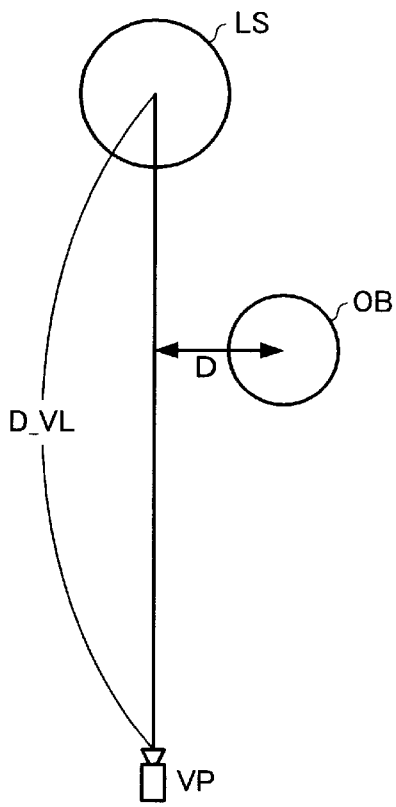
FIGS. 9A, 9B and 9C illustrate various techniques of judging the degree of overlap between the object OB and the light source LS.
Figure 9B:
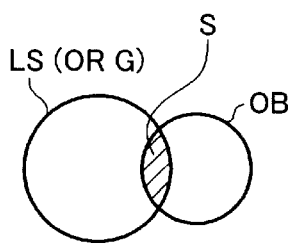

The degree of overlap between the object OB and the light source LS (or glow object G) may be judged, for example, from the distance D between the line between the viewpoint VP with the light source LS (or a representing point of the light source LS), as shown in FIG. 9A. Further, the degree of overlap may be judged from the area of overlap S (or area ratio) between the object OB and the light source LS (or glow object G) as viewed from the viewpoint, as shown in FIG. 9B. In other words, the effect intensity P_G of the glow object G is varied according to the distance D or the area S.

Figure 9C:
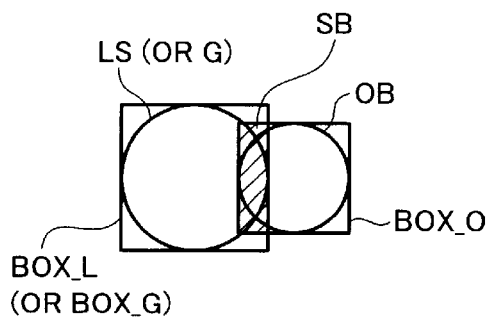

If the degree of overlap between the object OB and the light source LS (or glow object G) is to be judged from the area of overlap between the object OB and the light source LS (or glow object G), it is desirable to use bounding boxes BOX_O and BOX_L (which are bounding volumes in abroad sense) of the object OB and light source LS (or glow object G), as shown in FIG. 9C. In other words, the effect intensity P_G of the glow object G is varied according to the overlapping area SB between BOX_O including the object OB and BOX_L including the light source LS (or glow object G). When the bounding boxes (or bounding volumes) are used in such a manner, the area of overlap can be determined through a simplified process to reduce the processing load. Particularly, if the object OB and the light source LS (or glow object G) originally have bounding boxes for hit-checking, these bounding boxes can effectively be utilized.

The effect intensity P_G of the glow object G may be varied according to a distance D_VL between the viewpoint VP and the light source LS (or glow object G). In other words, the effect intensity P_G may gradually be reduced as the distance D_VL increases. Thus, a more realistic representation of glow can be made.

3. Process in this Embodiment

The detailed process of this embodiment will be described with reference to the flowcharts shown in FIGS. 10, 11, 12 and 13.

Figure 10:
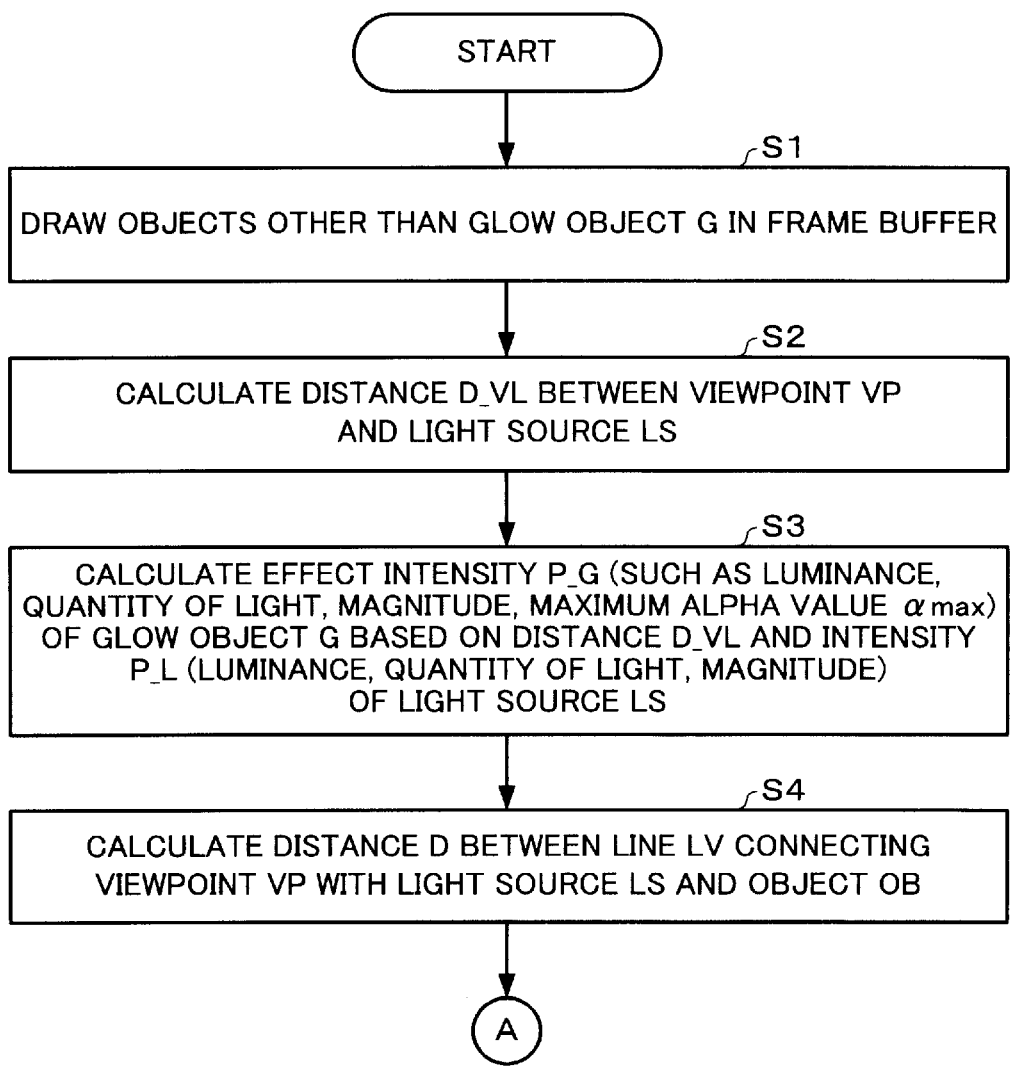
FIG. 10 is a flowchart illustrating the detailed process in this embodiment.
Figure 11:
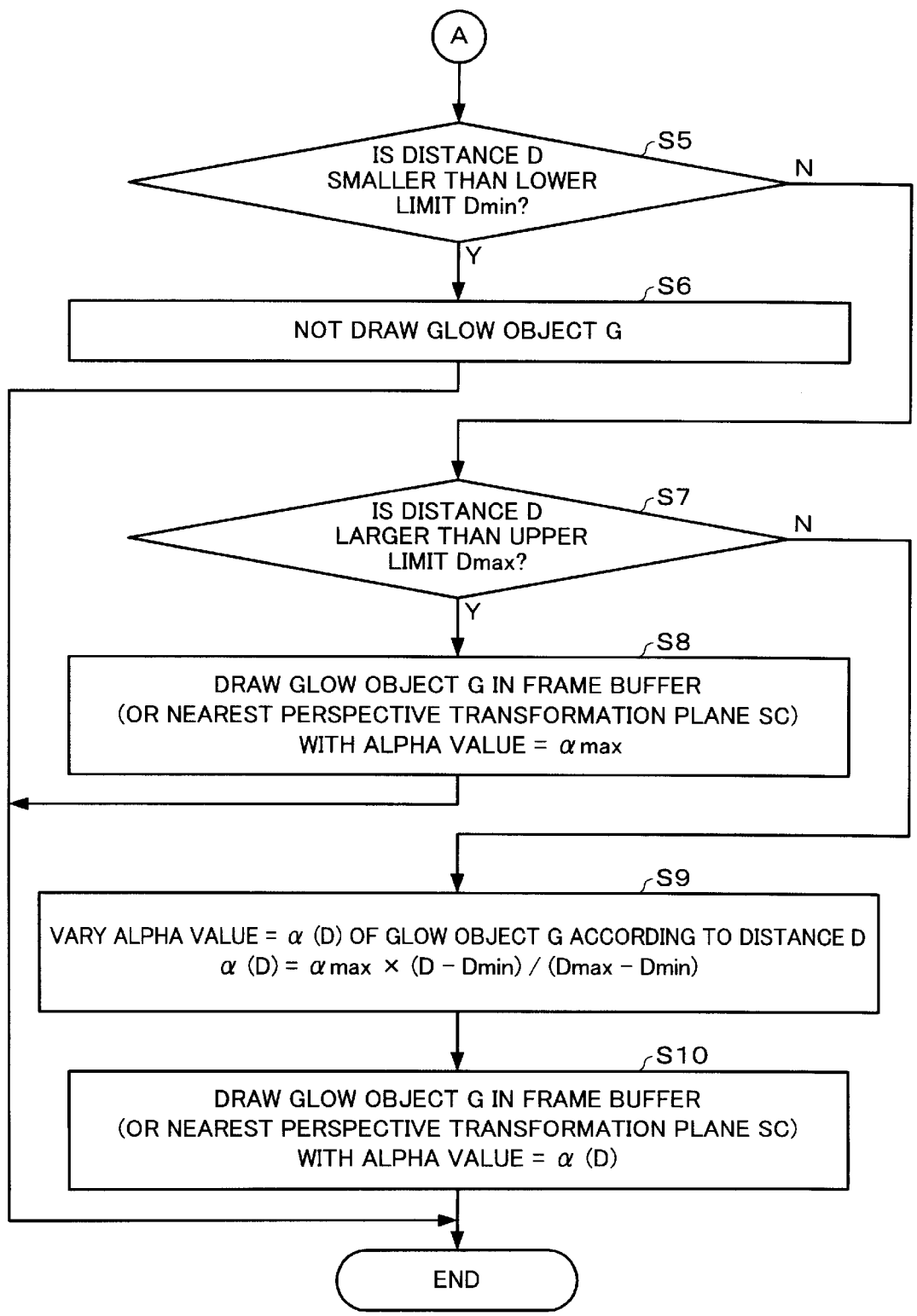
FIG. 11 is a flowchart illustrating the detailed process in this embodiment.

FIGS. 10 and 11 show a continued flowchart illustrating a process of varying the effect intensity of the glow according to the distance between the line between the viewpoint and the light source and the object.

Objects other than the glow object G (e.g., geometry processed object and perspectively transformed object) are first drawn in a frame buffer (which is a drawing buffer in a broad sense) (step S1).

Figure 14:
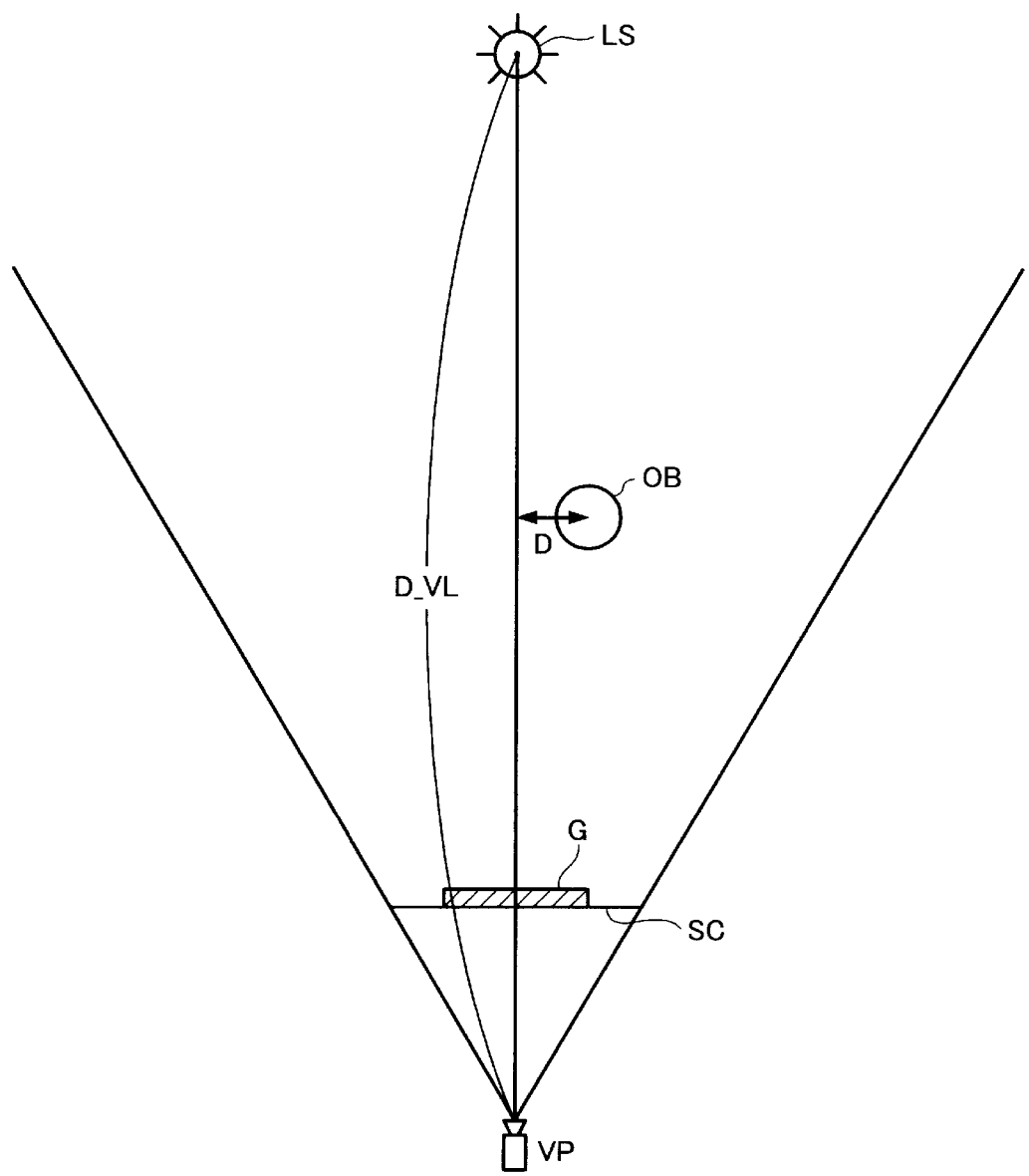
FIG. 14 illustrates the detailed process of this embodiment.

Subsequently, the distance D_VL between the viewpoint VP and the light source LS is calculated as shown in FIG. 14. This distance D_VL may be a straight-line distance between the viewpoint VP and the light source LS or a depth distance of the light source LS (Z value).

Based on the distance D_VL determined at the step S2 and the intensity P_L (luminance, quantity of light or magnitude) of the light source LS, the effect intensity P_G (luminance, quantity of light, magnitude or the maximum alpha value α max) of the glow object G is then calculated (step S3). Furthermore, the distance D between the line VL connecting between the viewpoint VP with the light source LS and the object OB is calculated as shown in FIG. 14 (step S4).

It is then judged whether or the distance D determined at the step S4 is smaller than its lower limit D min (first distance, for example, the radius of the object OB) (step S5). When D<D min, the process is terminated without drawing of the glow object G (step S6). Thus, a game image can be generated in which the glow object G is made non-display as shown in FIG. 3 at A3.

On the other hand, when it is judged at step S5 that D is equal to or larger than D min, it is then judged whether or not the distance D is larger than its upper limit D max (step S7). When D>D max, the glow object G is drawn in the frame buffer (or the nearest perspective transformation plane SC) with alpha value=α max (step S8). Thus, the game image including the drawn glow object G can be generated with the highest effect intensity, as shown in FIG. 3 at A1 and in FIG. 4 at A5).

Figure 15:
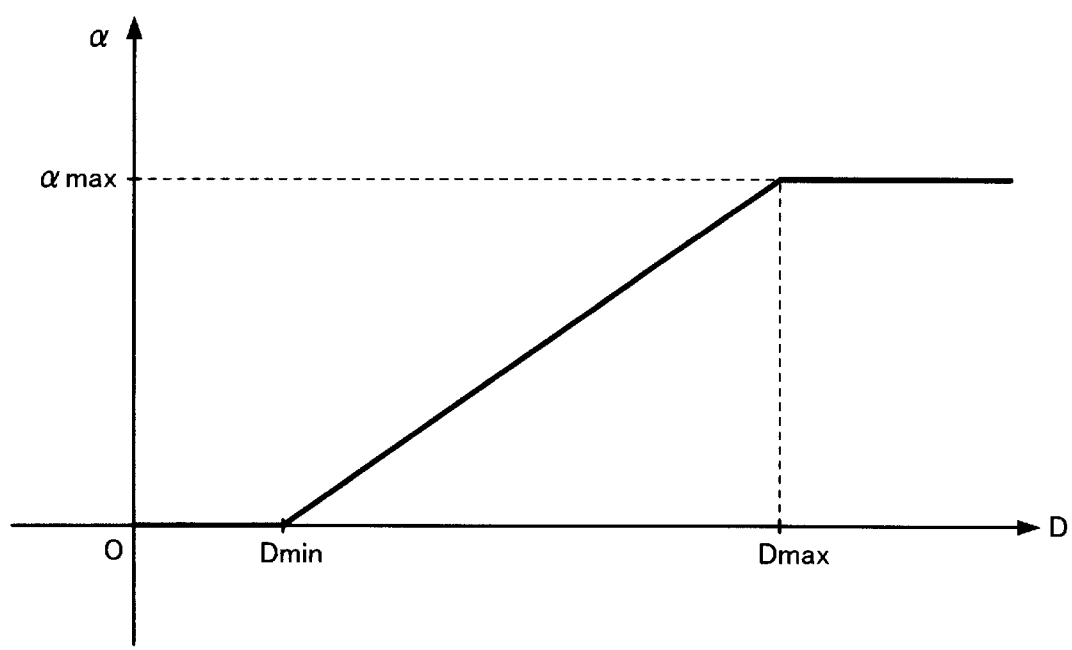
FIG. 15 illustrates the detailed process of this embodiment.

On the other hand, when it is judged at the step S7 that D is equal to or lower than D max, the alpha value (translucency)=α in the glow object G is varied according to the distance D (step S9), as shown in FIG. 15. More particularly, α(D) is determined by the following formula (1):

$$\alpha(D) = \alpha\ max \times (D - D\ min)/(D\ max - D\ min) \quad (1)$$

The glow object G is then drawn in the frame buffer (or the nearest perspective transformation plane SC) with alpha value=α(D) (step S10). Thus, the game image in which the glow object G having the effect intensity varied according to the distance D is drawn can be generated, as shown in FIG. 3 at A2 and in FIG. 4 at A4.

Figure 12:
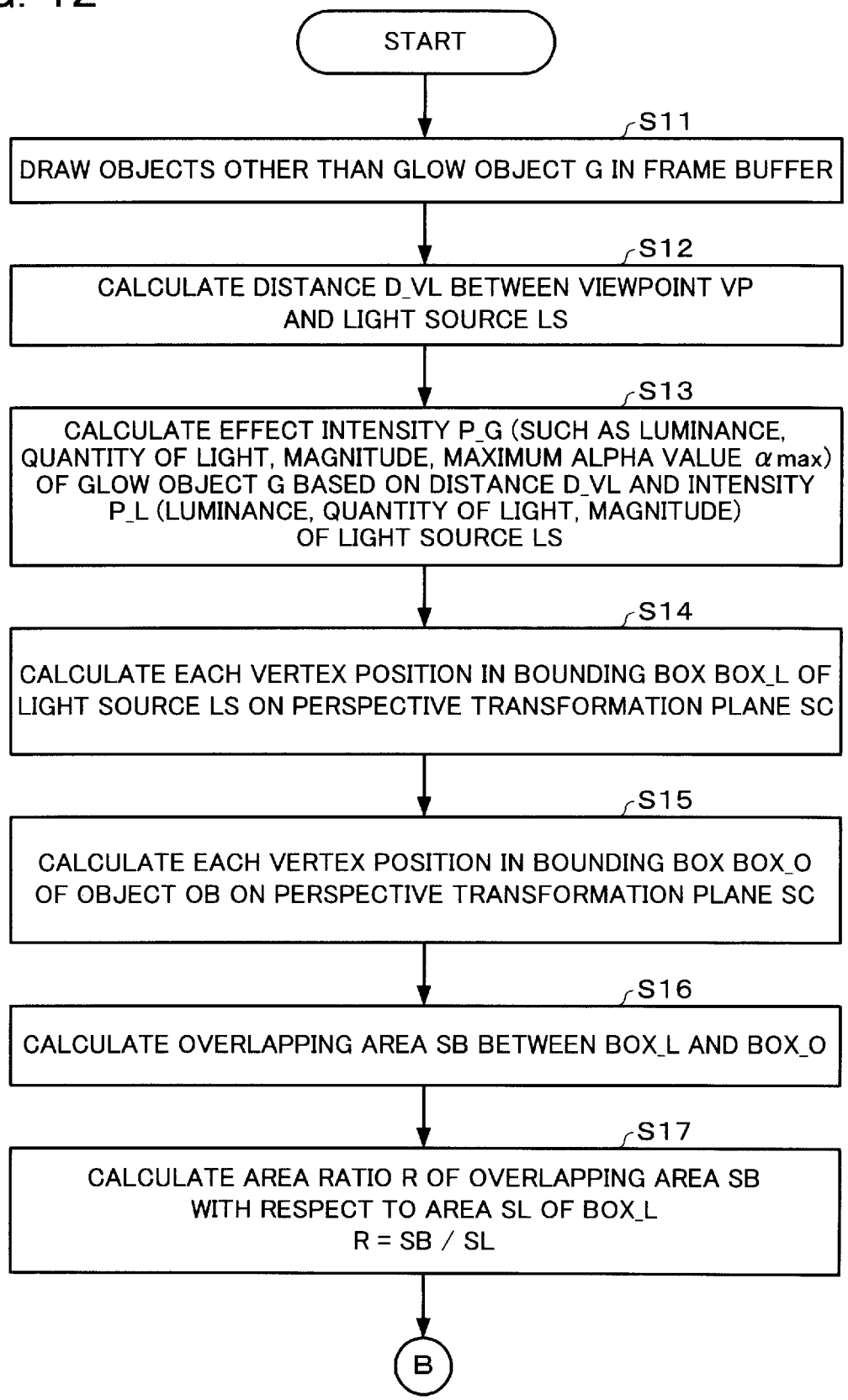
FIG. 12 is a flowchart illustrating the detailed process in this embodiment.
Figure 13:
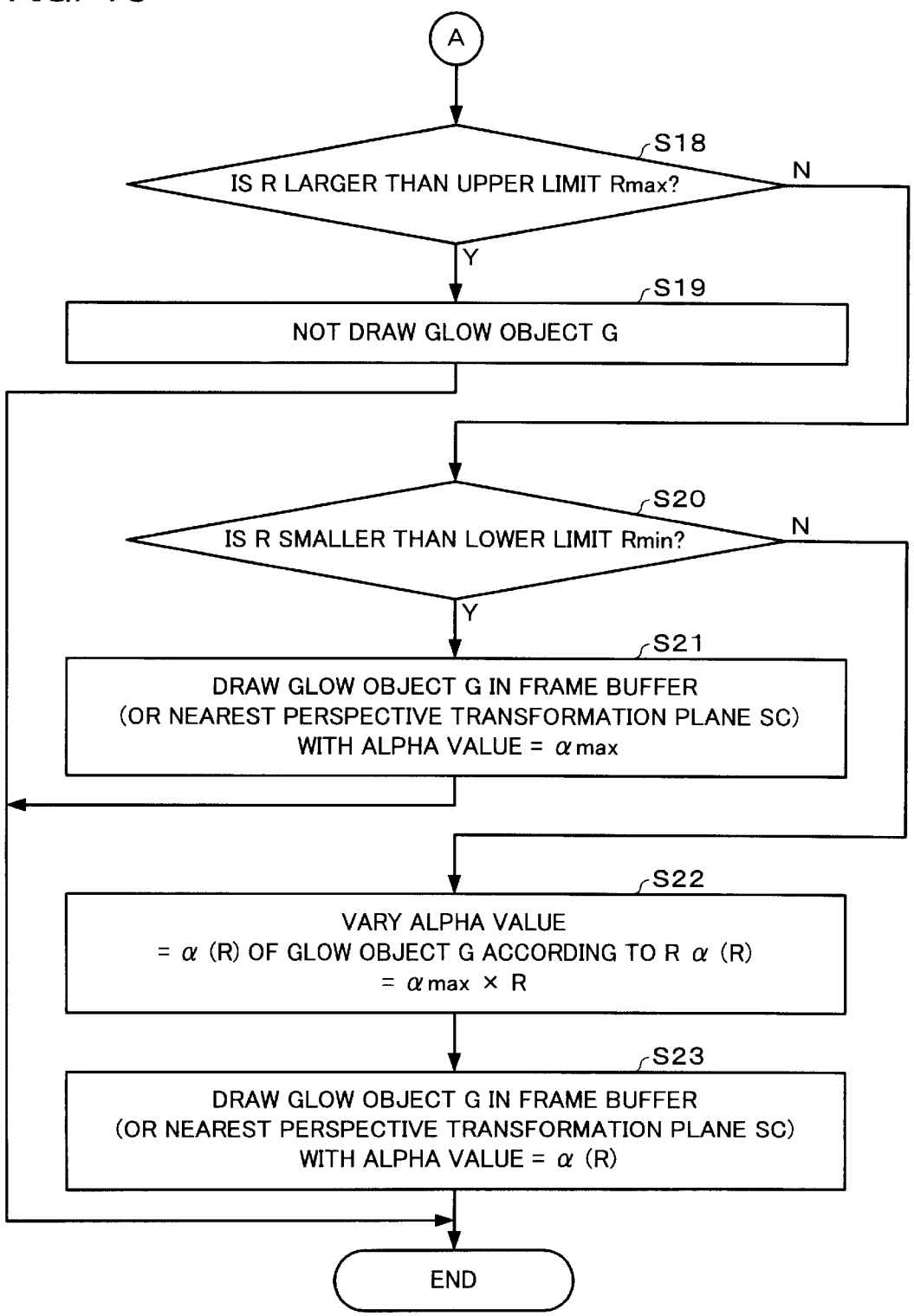
FIG. 13 is a flowchart illustrating the detailed process in this embodiment.

FIGS. 12 and 13 show a continued flowchart illustrating a process of varying the effect intensity of the glow according to the degree of overlap between the object and the light source.

Objects other than the glow object G are drawn in the frame buffer (step S11). The distance D_VL between the viewpoint VP and the light source LS is then calculated (step S12).

Figure 16:
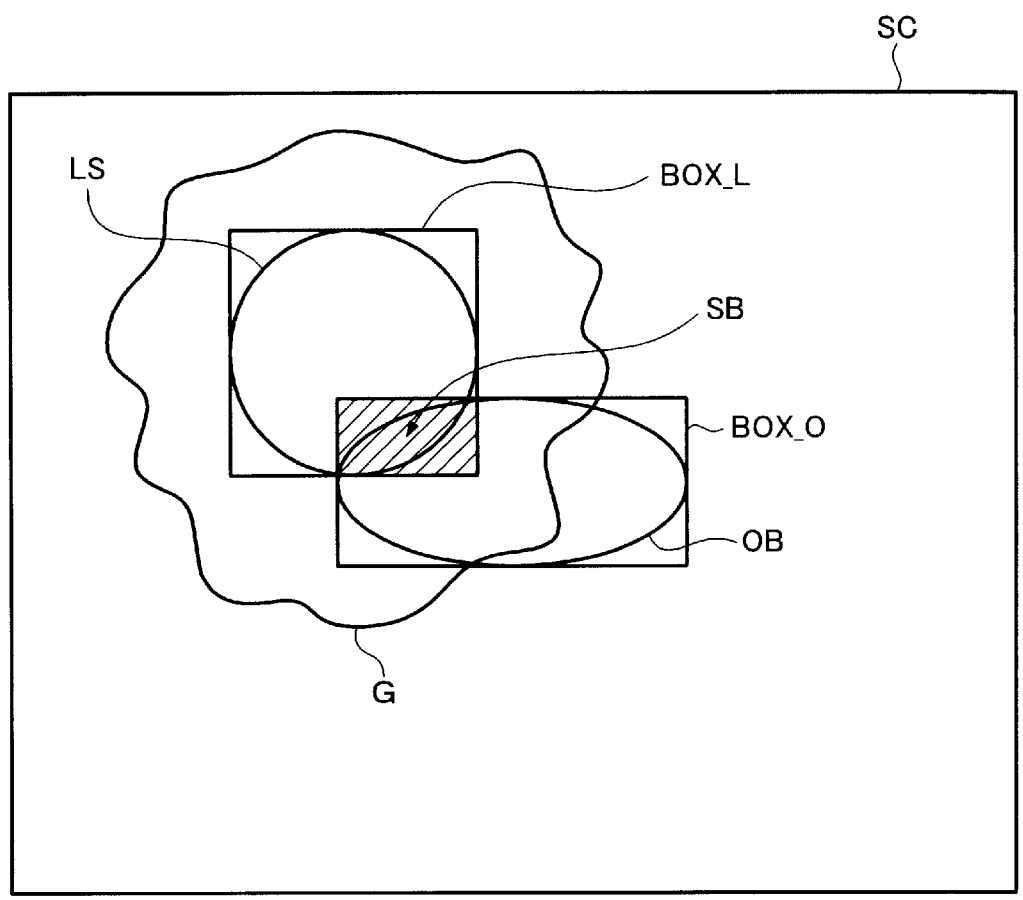
FIG. 16 illustrates the detailed process of this embodiment.

The effect intensity P_G of the glow object G is then calculated based on the distance D_VL determined at the step S12 and the intensity P_L of the light source LS (step S13). The position of each vertex on the bounding box BOX_L of the light source LS on the perspective transformation plane SC is also calculated as shown in FIG. 16 (step S14). Similarly, the position of each vertex on the bounding box BOX_O of the object OB on the perspective transformation plane SC is calculated (step S15).

The bounding boxes BOX_L and BOX_O may be determined by perspectively transforming a three-dimensional bounding box including the light source LS and object OB into the perspective transformation plane SC or based on the position of each vertex of the light source LS and object OB after they have been perspectively transformed onto the perspective transformation plane SC.

Subsequently, the overlapping area SB between the bounding boxes BOX_L and BOX_O is calculated as shown in FIG. 16 (step S16). The ratio R of the overlapping area SB to the area SL of BOX_L, R=SB/SL, is then calculated (step S17).

It is then judged whether or not the area ratio R determined at the step S17 is larger than its upper limit R max (first area (ratio)) (step S18). When R>R max, the process is terminated without drawing of the glow object G (step S19). Thus, the game image in which the glow object G is made non-display can be generated as shown in FIG. 3 at A3.

On the other hand, it is judged at step S18 that R is equal to or smaller than R max, it is then judged whether or not the area ration R is smaller than its lower limit R min (step S20). When R<R min, the glow object G is drawn in the frame buffer (or the nearest perspective transformation plane SC) with alpha value=α max (step S21). Thus, the game image in which the glow object G is drawn with the highest effect intensity can be generated as shown in FIG. 3 at A1 and in FIG. 4 at A5.

On the other hand, when it is judged at the step S20 that R is equal to or larger than R min, the alpha value=α(R) in the glow object G is varied according to the distance R (step S22). More particularly, the value α(R) is determined by the following formula (2):

$$\alpha(R) = \alpha\ max \times R \quad (2)$$

The glow object G is drawn in the frame buffer (or the nearest perspective transformation plane SC) with alpha value=α(R) (step S23). Thus, the game image in which the glow object G having the effect intensity varied according to the area ratio R is drawn can be generated as shown in FIG. 3 at A2 and in FIG. 4 at A4.

4. Hardware Structure

Figure 17:
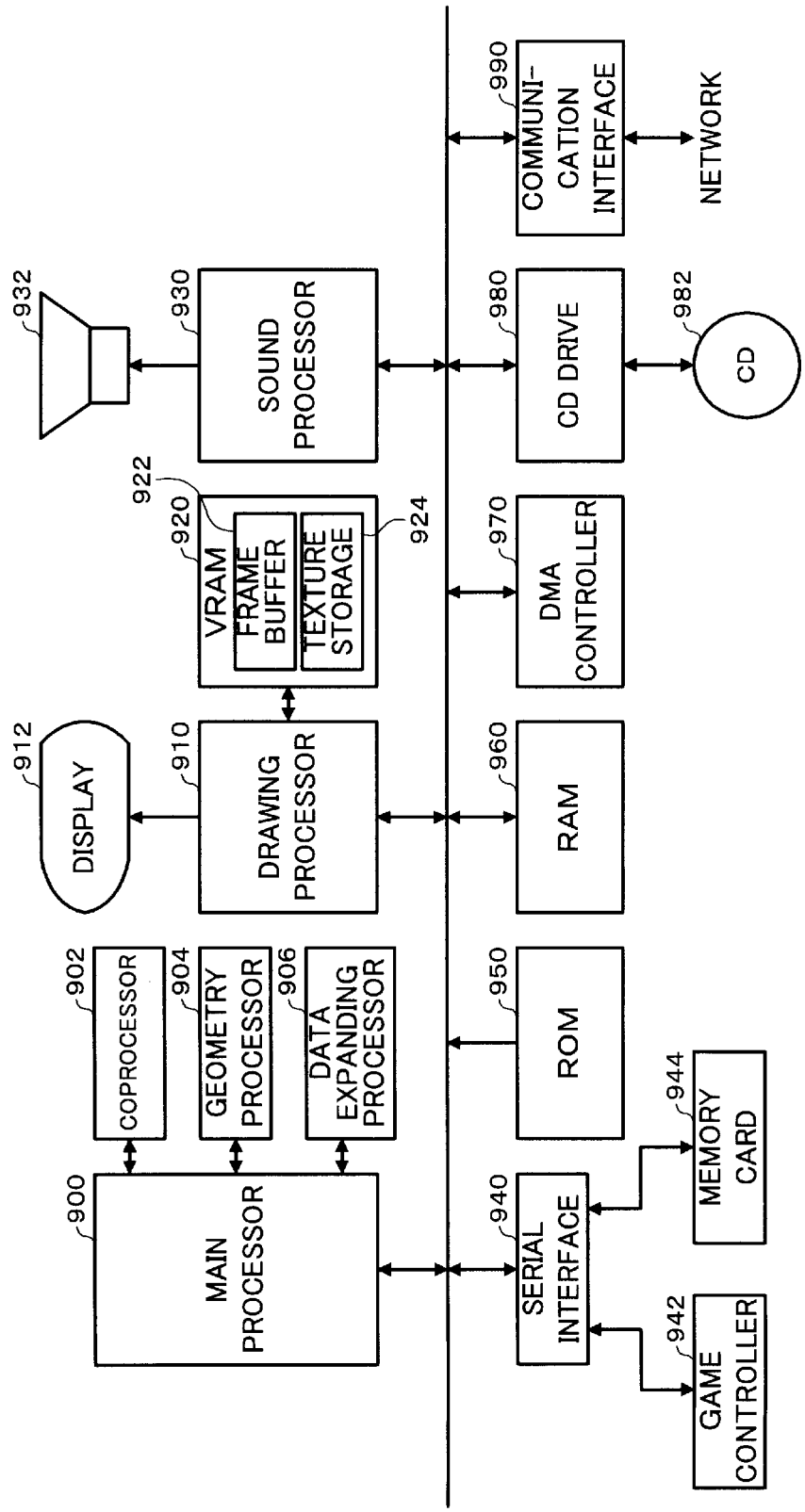
FIG. 17 shows a structure of hardware which can realize this embodiment.

A hardware structure for realizing this embodiment will be described with reference to FIG. 17.

A main processor 900 operates to perform various processings such as game processing, image processing, sound processing and so on, based on a program stored in a CD 982 (information storage medium), a program transmitted through a communication interface 990 or a program stored in a ROM 950 (which is one kind of information storage medium).

A coprocessor 902 aids the main processor 900 and has a product-sum operator and divider which can perform a high-speed computation. Thus, the coprocessor 902 can execute a matrix (or vector) computation at high speed. For example, when the matrix computation or the like is required by a physical simulation for performing the movement or motion of an object, a program running on the main processor 900 commits its own process to the coprocessor 902.

A geometry processor 904 is to perform a geometry processing for coordinate transformation, perspective transformation, light-source calculation, curve generation and so on and has a product-sum operator and divider which can perform a high-speed computation. Thus, the geometry processor 904 can execute a matrix (or vector) computation at high speed. For example, if a processing such as coordinate transformation, perspective transformation or light-source calculation is to be performed, a program running on the main processor 900 commits its own processing to the geometry processor 904.

A data expanding processor 906 is to expand and decode compressed image or sound data or to accelerate the decoding process in the main processor 900. Thus, an animated image compressed through MPEG or other can be displayed in an opening scene, intermission scene, ending scene or game scene. Image and sound data to be decoded may be stored in the ROM 950 and CD 982 or may externally be transferred through the communication interface 990.

A drawing processor 910 is to perform, at high speed, a process of drawing (or rendering) an object which is formed by primitive faces such as polygons or curves. When the object is to be drawn, the main processor 900 uses a DMA controller 970 to deliver the object data to the drawing processor 910 and if necessary, to transfer textures to a texture storage section 924. Thus, the drawing processor 910 uses the object data and textures to draw the object in a frame buffer 922 at high speed while performing the hidden-surface removal through a Z-buffer or the like. Moreover, the drawing processor 910 can also perform alpha blending (or translucency processing), depth-cueing, mip-mapping, fogging, bi-linear filtering, tri-linear filtering, anti-aliasing, shading and so on. When an image for one frame has been written into the frame buffer 922, its image will be displayed on a display 912.

A sound processor 930 includes a multi-channel ADPCM sound source and others for generating high-quality game sounds such as BGM, sound effects, voices and so on. The generated game sounds may be outputted through a speaker 932.

The operational data from a game controller 942 as well as the save data and personal data from a memory card 944 may be transferred through a serial interface 940.

The ROM 950 has stored system programs and so on. For an arcade game system, the ROM 950 serves as an information storage medium for storing various types of programs. In place of the ROM 950, any hard disk may be used.

RAM 960 is used as a working area for various processors.

The DMA controller 970 functions to control DMA transfer between the processors and the memories (RAM, VRAM, ROM and the like).

CD drive 980 can drive the CD 982 (information storage medium) which has stored the programs, image data or sound data for accessing them.

The communication interface 990 functions to perform the data transfer between the game system and any external means through a network. In such a case, the network connectable to the communication interface 990 may be in the form of a communication line (i.e., analog telephone line or ISDN) or the bus of a high-speed serial interface. Thus, the data transfer can be executed through INTERNET by using the communication line. When the bus of the high-speed serial interface is used, the data transfer can be performed between the present game system and any other image generating systems.

All the means used in the present invention may be executed only through hardware means or only through programs which have been stored in the information storage medium or externally distributed through the communication interface. Alternatively, all the means may be executed both by the hardware means and programs.

When all the means are executed both by the hardware means and programs, the information storage medium will have stored a program (or program and data) for executing the means of the present invention through the hardware means. More particularly, the program instructs the respective processors 902, 904, 906, 910 and 930 which are hardware means and delivers data to them, if necessary. Each of the processors 902, 904, 906, 910 and 930 will execute the corresponding means of the present invention based on the instruction and delivered data.

Figure 18A:
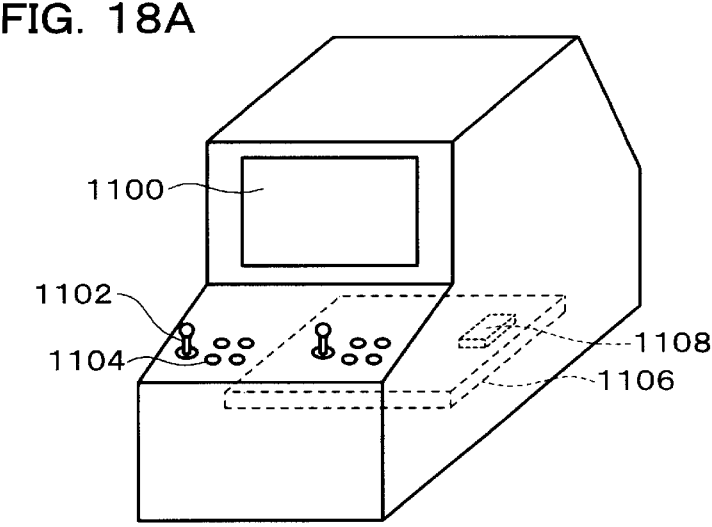
FIGS. 18A, 18B and 18C show various system forms to which this embodiment can be applied.

FIG. 18A shows an arcade game system to which this embodiment is applied. Players enjoy a game by operating levers 1102, buttons 1104 and the like while viewing a game scene displayed on a display 1100. The game system includes a system board (or circuit board) 1106 on which various types of processors and memories are mounted. Information (program or data) for executing the means of the present invention has been stored in a memory (or information storage medium) 1108 on the system board 1106. The information will be referred to "stored information".

Figure 18B:
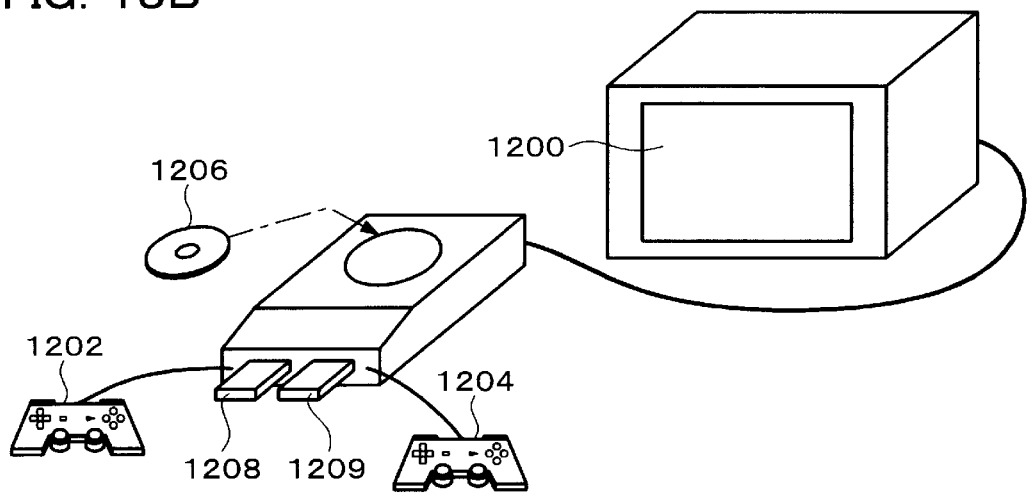

FIG. 18B shows a home game system to which this embodiment is applied. A player enjoys a game by manipulating game controllers 1202 and 1204 while viewing a game picture displayed on a display 1200. In such a case, the aforementioned stored information has been stored in CD 1206 or memory cards 1208, 1209 which are detachable information storage media in the game system.

Figure 18C:
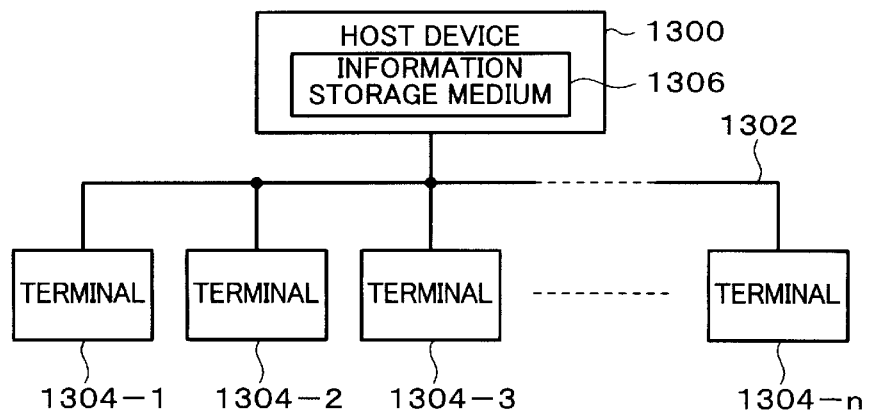

FIG. 18C shows an example wherein this embodiment is applied to a system which includes a host device 1300 and terminals 1304-1 to 1304-n (game machines or portable telephones) connected to the host device 1300 through a network (which is a small-scale network such as LAN or a global network such as INTERNET) 1302. In such a case, the above stored information have been stored in an information storage medium 1306 such as magnetic disk device, magnetic tape device, memory or the like which can be controlled by the host device 1300, for example. If the terminals 1304-1 to 1304-n can generate game images and game sounds in a stand-alone manner, the host device 1300 delivers game programs and others for generating game images and game sounds to the terminals 1304-1 to 1304-n. On the other hand, if the game images and sounds cannot be generated by the terminals in the stand-alone manner, the host device 1300 will generate the game images and sounds which are in turn transmitted to the terminals 1304-1 to 1304-n and outputted through them.

In the arrangement of FIG. 18C, the means of the present invention may be decentralized into the host device (or server) and terminals. The above information for executing the means of the present invention may be distributed and stored into the information storage media of the host device (or server) and terminals.

Each of the terminals connected to the network may be either of home or arcade type. When the arcade game systems are connected to the network, it is desirable that each of the arcade game systems includes a portable information storage device (memory card or portable game machine) which can not only transmit the information between the arcade game systems but also transmit the information between the arcade game systems and the home game systems.

The present invention is not limited to the aforementioned embodiment, but may be carried out in any of various other changed forms.

Although it is desirable that an object represented by the light source effect object is glow or halo, the present invention is not limited to such an object and it can represent anyone for representing the glare of the light source.

Although this embodiment has been described as to drawing of the light source effect object onto the perspective transformation plane, the present invention is not limited to such a thing. The light source effect object may be drawn at least between the first object and the viewpoint. For example, the light source effect object may be drawn nearer to a viewpoint than all the objects within the object space.

Techniques of non-displaying (eliminating) the light source effect object and reducing the effect intensity of the light source effect object are not limited to those described in connection with this embodiment, but may similarly be realized through any of various other forms.

The technique of judging the degree of overlap between the first object and the light source (or the light source effect object) is also not limited to the technique described in connection with FIGS. 9A, B and C, but may similarly be carried out through any of various other forms.

For example, in an invention of the present invention relating to each of the sub-claims, part of the components in an independent claim to which the sub-claim belongs may be omitted. The primary part of an invention relating to an independent claim of the present invention may belong to any other independent claim.

The present invention may similarly be applied to any of various games such as fighting games, shooting games, racing games, robot combat games, sports games, competitive games, roll-playing games, music playing games, dancing games and so on.

Furthermore, the present invention can be applied to various. image generating systems such as arcade game systems, home game systems, large-scaled multi-player attraction systems, simulators, multimedia terminals, game image generating system boards and so on.

What is claimed is:

1. A game system generating an image, comprising:
   means for performing a processing to display at least part of a light source effect object, which is used to virtually represent a glare of a light source, nearer to a viewpoint than a first object, when the first object located nearer to the viewpoint than the light source overlaps the light source effect object as viewed from the viewpoint; and
   means for generating an image viewable from the viewpoint in an object space.

2. The game system according to claim 1,
   wherein the light source effect object is drawn between the first object and the viewpoint, even when the first object is located nearer to the viewpoint than the light source.

3. The game system according to claim 2,
   wherein the light source effect object is drawn at a position on a perspective transformation plane corresponding to a position of the light source.

4. The game system according to claim 1,
   wherein the light source effect object is made non-display or effect intensity of the light source effect object is reduced when the first object is on a line between the light source and the viewpoint.

5. A game system generating an image, comprising:
   means for making non-display a light source effect object used to virtually represent a glare of a light source or for reducing effect intensity of the light source effect object when a first object is on a line between the light source and a viewpoint; and
   means for generating an image viewable from the viewpoint in an object space.

6. The game system according to claim 1,
   wherein the effect intensity of the light source effect object is varied according to a degree of overlap between the first object and the light source or between the first object and light source effect object as viewed from the viewpoint.

7. A game system for generating an image, the program comprising:
   means for varying effect intensity of a light source effect object, which is used to virtually represent a glare of the light source, according to a degree of overlap between the light source and a first object located nearer to a view point than the light source or between the light source effect object and the first object as viewed from the viewpoint; and
   means for generating an image viewable from the viewpoint in an object space.

8. The game system according to claim 7,
   wherein the effect intensity of the light source effect object is varied according to a distance between a line between the light source with the viewpoint and the first object.

9. The game system according to claim 8,
   wherein the light source effect object is made non-display when the distance between the line between the light source with the viewpoint and the first object is smaller than a given first distance.

10. The game system according to claim 7,
    wherein the effect intensity of the light source effect object is varied according to an area of overlap between the first object and the light source or between the first object and light source effect object as viewed from the viewpoint.

11. The game system according to claim 10,
    wherein the light, source effect object is made non-display when an area of overlap between the first object and the light source or between the first object and light source effect object as viewed from the viewpoint is larger than a given first area.

12. The game system according to claim 7, wherein the effect intensity of the light source effect object is varied by controlling alpha (α) value of the light source effect object according to the degree of overlap between the first object and the light source effect object as viewed from the viewpoint.

13. The game system according to claim 7, wherein the degree of overlap between the first object and the light source or between the first object and the light source effect object is determined using at least one of a first bounding volume for the first object and a second bounding volume for the light source or the light source effect object.

14. A computer-usable program embodied on an information storage medium or in a carrier wave, the program comprising a processing routine for a computer to realize:

means for performing a processing to display at least part of a light source effect object, which is used to virtually represent a glare of a light source, nearer to a viewpoint than a first object, when the first object located nearer to the viewpoint than the light source overlaps the light source effect object as viewed from the viewpoint; and means for generating an image viewable from the viewpoint in an object space.

15. The program according to claim 14, wherein the light source effect object is drawn between the first object and the viewpoint, even when the first object is located nearer to the viewpoint than the light source.

16. The program according to claim 15, wherein the light source effect object is drawn at a position on a perspective transformation plane corresponding to a position of the light source.

17. The program according to claim 14, wherein the light source effect object is made non-display or effect intensity of the light source effect object is reduced when the first object is on a line between the light source and the viewpoint.

18. A computer-usable program embodied on an information storage medium or in a carrier wave, the program comprising a processing routine for a computer to realize:

means for making non-display a light source effect object used to virtually represent a glare of a light source or for reducing effect intensity of the light source effect object when a first object is on a line between the light source and a viewpoint; and means for generating an image viewable from the viewpoint in an object space.

19. The program according to claim 14, wherein the effect intensity of the light source effect object is varied according to a degree of overlap between the first object and the light source or between the first object and light source effect object as viewed from the viewpoint.

20. A computer-usable program embodied in an information storage medium or carrier wave, the program comprising a processing routine for a computer to realize:

means for varying effect intensity of a light source effect object, which is used to virtually represent a glare of the light source, according to a degree of overlap between the light source and a first object located nearer to a view point than the light source or between the light source effect object and the first object as viewed from the viewpoint; and means for generating an image viewable from the viewpoint in an object space.

21. The program according to claim 20, wherein the effect intensity of the light source effect object is varied according to a distance between a line between the light source with the viewpoint and the first object.

22. The program according to claim 21, wherein the light source effect object is made non-display when the distance between the line between the light source with the viewpoint and the first object is smaller than a given first distance.

23. The program according to claim 20, wherein the effect intensity of the light source effect object is varied according to an area of overlap between the first object and the light source or between the first object and light source effect object as viewed from the viewpoint.

24. The program according to claim 23, wherein the light source effect object is made non-display when an area of overlap between the first object and the light source or between the first object and light source effect object as viewed from the viewpoint is larger than a given first area.

25. The program according to claim 20, wherein the effect intensity of the light source effect object is varied by controlling alpha (α) value in the light source effect object according to the degree of overlap between the first object and the light source effect object as viewed from the viewpoint.

26. The program according to claim 20, wherein the degree of overlap between the first object and the light source or between the first object and the light source effect object is determined using at least one of a first bounding volume for the first object and a second bounding volume for the light source or the light source effect object.

27. A method for generating an image, comprising steps of:

performing a processing to display at least part of a light source effect object, which is used to virtually represent a glare of a light source, nearer to a viewpoint than a first object, when the first object located nearer to the viewpoint than the light source overlaps the light source effect object as viewed from the viewpoint; and generating an image viewable from the viewpoint in an object space.

28. The method according to claim 27, wherein the light source effect object is drawn between the first object and the viewpoint, even when the first object is located nearer to the viewpoint than the light source.

29. The method according to claim 28, wherein the light source effect object is drawn at a position on a perspective transformation plane corresponding to a position of the light source.

30. The method according to claim 27, wherein the light source effect object is made non-display or effect intensity of the light source effect object is reduced when the first object is on a line between the light source and the viewpoint.

31. A method for generating an image, comprising steps of:

making non-display a light source effect object used to virtually represent a glare of a light source or reducing effect intensity of the light source effect object when a first object is on a line between the light source and a viewpoint; and generating an image viewable from the viewpoint in an object space.

32. The method according to claim 27, wherein the effect intensity of the light source effect object is varied according to a degree of overlap between the first object and the light source or between the first object and light source effect object as viewed from the viewpoint.

33. A method for generating an image, comprising steps of:

varying effect intensity of a light source effect object, which is used to virtually represent a glare of the light source, according to a degree of overlap between the light source and a first object located nearer to a view point than the light source or between the light source effect object and the first object as viewed from the viewpoint; and generating an image viewable from the viewpoint in an object space.

34. The method according to claim 33, wherein the effect intensity of the light source effect object is varied according to a distance between a line between the light source with the viewpoint and the first object.

35. The method according to claim 34, wherein the light source effect object is made non-display when the distance between the line between the light source with the viewpoint and the first object is smaller than a given first distance.

36. The method according to claim 33, wherein the effect intensity of the light source effect object is varied according to an area of overlap between the first object and the light source or between the first object and light source effect object as viewed from the viewpoint.

37. The method according to claim 36, wherein the light source effect object is made non-display when an area of overlap between the first object and the light source or between the first object and light source effect object as viewed from the viewpoint is larger than a given first area.

38. The method according to claim 33, wherein the effect intensity of the light source effect object is varied by controlling alpha ($\alpha$) value of the light source effect object according to the degree of overlap between the first object and the light source effect object as viewed from the viewpoint.

39. The method according to claim 33, wherein the degree of overlap between the first object and the light source or between the first object and the light source effect object is determined using at least one of a first bounding volume for the first object and a second bounding volume for the light source or the light source effect object.

\* \* \* \* \*